（12） United States Patent
Koelliker et al.

(10) Patent No.: US 6,998,012 B2
(45) Date of Patent: Feb. 14, 2006

(54) HYDRAULIC FIXING AGENT AND METHOD FOR REDUCING THE COHESION OF A LAYER OF BONDED FIXING AGENT

(75) Inventors: Robert Koelliker, Oberkirch (CH); Josef Zemp, Ruswil (CH)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 62 days.

(21) Appl. No.: 10/716,648

(22) Filed: Nov. 19, 2003

(65) Prior Publication Data

US 2004/0137151 A1    Jul. 15, 2004

(30) Foreign Application Priority Data

Nov. 20, 2002    (DE) ................................ 102 54 232
Dec. 12, 2002    (DE) ................................ 102 58 181

(51) Int. Cl.
*B32B 31/14*    (2006.01)
*B32B 33/00*    (2006.01)
*B32B 35/00*    (2006.01)

(52) U.S. Cl. .................... 156/344; 134/26; 134/42; 427/271; 427/336; 427/337

(58) Field of Classification Search .................... 134/2, 134/22.13, 22.14, 22.16, 22.17, 22.19, 26, 134/38, 42, 155; 427/258, 270, 271, 273, 427/307, 336, 337, 419.1, 419.7, 419.8; 156/344
See application file for complete search history.

(56) References Cited

FOREIGN PATENT DOCUMENTS

DE    32 15777 A1    4/1982
DE    43 42 407 C2    6/1995

*Primary Examiner*—Christopher A. Fiorilla
*Assistant Examiner*—Sing Po Chan
(74) *Attorney, Agent, or Firm*—Charles W. Almer

(57) ABSTRACT

Hydraulic fixing agent that is based on Portland cement, a sulphate and aluminum component that is usual in this system, and optionally other additives. This is characterized in that, according to DIN 18156 (Part 2, Sec. 5.2.2.2, 5.2.2.3a) and 5.2.2.4), the hydraulic fixing agent has (1) an adhesive pull strength of at least approximately 0.15 N/mm$^2$ when acted upon by water for 40 hours and (2) an adhesive pull strength of at most approximately 0.10 N/mmyy2 when acted upon by an aqueous sulphate solution and/or an aqueous solution of an aluminum salt, each of which has a pH value of 12.5, for a period of 40 hours.

17 Claims, 1 Drawing Sheet

HYDRAULIC FIXING AGENT AND METHOD FOR REDUCING THE COHESION OF A LAYER OF BONDED FIXING AGENT

The present application is a continuation of and claims priority from German Patent Applications Number 102 54 232.5, filed Nov. 20, 2002 and 102 58 181.9, filed Dec. 12, 2002.

FIELD OF THE INVENTION

The present invention relates to a hydraulic fixing agent and to a method for reducing the cohesion of a layer of bonded fixing agent.

BACKGROUND OF THE INVENTION

Commercially available coverings, for example, those of ceramics such as pottery, vitrified clay, fine ground clay, or of plastic, metal, or glass, are highly resistant, durable, and are available in a variety of shapes, colours, and designs. Because of their outstanding properties and shaping aspects it is customary to install coatings or coverings of this kind on the walls and floors of bathrooms, sanitary facilities, and living areas. These properties constitute the reason why such materials are preferred for new constructions and when renovating one's own home.

The situation is completely different in the case of rented accommodation and hotels. Because of the strength and the durability of the coverings, as well as the adhesion of the mortar or cement that is used, the old coverings must be laboriously chiselled off by hand or by using electric or pneumatic chisels when, as a rule, the covering is destroyed. The disadvantages in this are obvious: high costs and the considerable amounts of time and labour that are involved in removing the covering; the dust, dirt, and noise that are generated; the possibility of damage being done to the surface behind the covering; the associated costly refinishing that has be undertaken in order to install a new covering; and the waiting period between preparatory work and the start of the reinstallation, i.e., long total time for the renovation.

Increasing consumer interest in up-to-date fashion trends and design, and ever-shorter modernization cycles and demands for renovation make constant updating and broadening of selection essential, and demand practical systems that can be removed and replaced without difficulty.

Dry-installation systems were developed; in these, the tiles were cemented to a frame that had lugs on its sides, and these lugs snapped into corresponding parts of the adjacent elements. When this was done, nothing was cemented or screwed down to the underlying surface, so that the noise of footsteps became an annoyance. Walls cannot be tiled using this system. In addition, this system is relatively costly and inflexible with regard to available designs and shapes, as well as with regard to possible installation surfaces. It is also questionable whether such systems are sufficiently resistant to water and damp to permit their use in bathrooms (see M. Henke, *Fliesen und Platten* [Tiles and Panels], p. 72, No. 6, 2002).

The Mapetex System, developed by Mapei GmbH is based on a completely different system. In this system, a special non-woven fabric of polyester fibres is first applied to the underlayment. In order to affix this, a self-adhesive burr strip is cemented onto the cleaned subsurface. In the case of a wall installation, a number of adhesive strips are applied at specific intervals; as the weight of the tiles increases, the spacing between the strips must be made smaller. The non-woven fabric is applied to these strips, and the tiles are installed on this fabric. One important shortcoming of this type of construction is inadequate adhesion between the subsurface and the fabric; in the event of excessive loading, vibration, or stress cracking, this could result in the failure of the complete construction. The complicated method whereby the tiles are applied is made additionally difficult by the fact that cleanliness is paramount when the tiles are applied since any dirt, dust, or the like will degrade the adhesive effect of the adhesive strip between the wall and the fabric, so that there is insufficient adhesion. Because of the relatively poor bond between the subsurface and the tiles, sooner or later water will get through cracks or joints in tiled surfaces in the bath area, for example, in wet traps, and this will result in the growth of mould (W. Mauer, Op. Cit, p. 24, Vol. 4, 2001).

For this reason, it is the objective of the present invention to describe an hydraulic fixing agent and method by which a bonded layer of fixing agent—which optionally has a covering layer—can be applied without difficulty in the usual manner but which can be removed very simply at any time, for example after a number of years. When removed, the disadvantages inherent in the prior art should not be encountered, i.e., there should be no dust, no noise, and a significant reduction in renovation times.

SUMMARY OF THE INVENTION

The objective has been achieved with an hydraulic fixing agent that is based on Portland cement, a sulphate and aluminum component that is usual in this system, and optionally other additives; according to DIN 18156 (Part 2, Sec. 5.2.2.2, 5.2.2.3a) and 5.2.2.4), the hydraulically bonded fixing agent should have (1) an adhesive pull strength of at least approximately 0.15 $N/mm^2$ when acted upon by water for 40 hours and (2) an adhesive pull strength of at most approximately 0.10 $N/mm^2$ when acted upon by an aqueous sulphate solution and/or an aqueous solution of an aluminum salt, each with a pH value of 12.5, for 40 hours.

More advantageously, the adhesive pull strength is at least approximately 0.2 $N/mm^2$, in particular at least approximately 0.3 $N/mm^2$ when acted upon by water, and at most 0.075 $N/mm^2$, in particular at most approximately 0.05 $N/mm^2$ when acted upon by an aqueous sulphate solution or an aqueous solution of an aluminum salt.

DETAILED DESCRIPTION OF THE PREFERRED EMBODIMENTS

Figure 2:
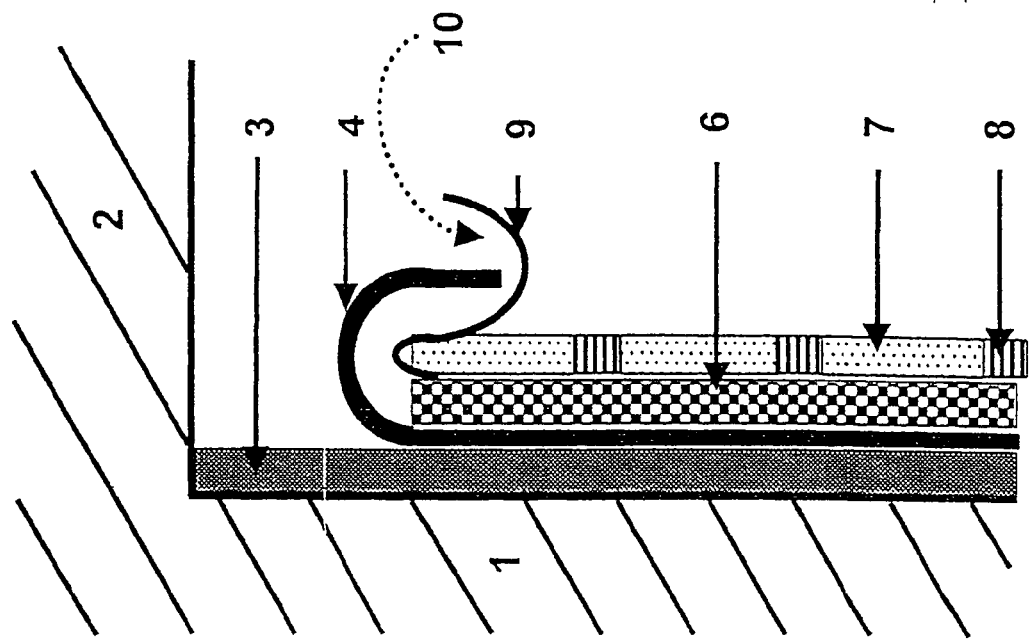
FIG. 2: the procedure whereby the tiles shown in FIG. 1 are detached using the procedure according to the present invention.

DIN 18156 (March 1978) is definitive for the measurement of adhesive pull strength and means that according to the present invention a hydraulic fixing agent is made available, the adhesion of which most surprisingly remains unchanged when acted upon by water but which exhibits a marked reduction of adhesion when an aqueous solution of a sulphate and/or aluminum salt is added. These characteristics of the fixing agent according to the present invention can be used to advantage for simply removing the bonded fixing agent from the subsurface at a particular time, the fixing agent simultaneously displaying all the typical characteristics such as good processability and the required adhesion values after dry, wet, or hot bedding on different substrates.

The base system of the present invention is built up from three components. These are Portland cement, a conventional sulphate component, and an aluminum component. The following can be used as the sulphate component: calcium sulphate as anhydrite, gypsum (dihydrate) and its α and β semihydrates, magnesium sulphate, alkali sulphates, iron sulphates, sodium and calcium hydrogen sulphates, monosulphate, mixed sulphates such as the group of syngenite, lecontite, koktaite, eugsterite, hydroglauberite, wattevillite, mirabilite and the like. Aluminum components that can be used include high alumina cement such as Fondue Lafarge, ternal types or istra types, and/or enriched aluminate Portland cements. Others are aluminum sulphate, sulfoaluminate cements (SAC) or expanding-cement additives such as Denka SAC, Asano Gypcal, or Onoda Expan.

Only specific quantity ranges for the three components are considered in order to permit adjustment of the above adhesive pull strengths, for all three components affect the bonding process. For this reason, the skilled practitioner must conduct appropriate tests in order to discover compositions that satisfy the prerequisites that have been discussed. It is true that the required adhesive pull strengths set out above cannot be achieved with every one of the compounds, but the expert can determine the suitable formulation within the framework of his professional endeavours, given reasonable labour costs. The preferred quantitative basic conditions are as follows: in the hydraulic fixing agent, 1 part/wt Portland cement, approximately 0.05 to 5, in particular approximately 0.5 to 3 parts-wt sulphate component, and approximately 0.05 to 20, in particular approximately 0.1 to 10 parts/wt of aluminum component.

The fixing agent according to the present invention can be in the form of a mortar formulation, for example.

Additives such as fillers, cellulose ether, set-up agents, inhibitors, accelerants, wetting agents, pore-forming agents, thickeners, liquifiers and/or organic fixing agents can optionally be added to the hydraulic fixing agent. Redispersable powders or dispersions can be used as organic fixing agents; these are particularly preferred because of their characteristics. Amongst other things, they serve to optimize the rheological properties, hygrostability, adhesive pull strength, and the like.

A further object of the present invention is a method for reducing the cohesion of a layer of bonded fixing agent obtained with the above described hydraulic fixing agent according to the present invention, the layer of bonded fixing agent being treated with an aqueous sulphate solution and/or an aqueous solution of an aluminum salt, each having a pH value of at least approximately 7.5, in particular of at least approximately 9 to 14, and the coating of bonded mortar with its adhesion and/or cohesion reduced is removed.

As has been discussed heretofore, one special characteristic of the fixing agent according to the present invention is that the adhesive pull strength of the hardened fixing agent is significantly reduced by the addition of an appropriate aqueous sulphate and/or aluminum-salt solution. Very possibly, this can be attributed to the fact that the aqueous sulphate and/or aluminum-salt solution together with the constituents of the fixing agent form an expanding mineral, whereby the adhesive properties of the fixing agent are reduced, i.e., within a few hours or days, the adhesion of the bonded fixing agent is so reduced that it can be removed with very little effort. In the present case, the mineral that is formed could be ettringite or ettringite-like material.

Ettringite, $Ca_6Al_s[(OH)_4/SO_4]_3 \times 24\ H_2O \times 26\ H_2O$ is a colourless or yellow hexagonal mineral inthe form of transparent or translucent sheeny needles that may in part grow to form felt-like aggregates. This mineral can be found, for instance, in converted limestone inclusions in basalt lava from Ettringen, near Mayen/Eiffel, from which it derives its name. The formation of ettringite can result in powerful expansion, when very large forces can be generated.

The formation of ettringite per se is known from the prior art, although it is used in other areas. This applies, for example to the so-called expanding cements that are used when casting ferroconcrete parts or plaster joints and when laying parquet floors. The three most commonly used expanding cements, Types K, M, and S, differ with respect to the origin of the aluminum and sulphate components from which the ettringite is formed when large quantities of water are absorbed during the hydration process, whereby contraction can be controlled. However, ettringite formation is also known mainly for its disadvantages. In the case of normal Portland cement, the $SO_4$ content of which serves only to retard the solidification process, and which brings about no expansion itself, is undesirable and can only occur if sulphate gets in from outside. This means that structures with an appropriate composition of the fixing agent can be severely damaged by the uncontrolled formation of ettringite if acted upon by water that always contains small quantities of sulphates.

According to the present invention, it is an entirely novel concept to exploit the formation of ettringite in order to permit the removal of a layer that contains a fixing agent, and to do so after a number of years, for example. Expansion that is brought about by the formation of ettringite or minerals that contain ettringite by the addition of an aqueous sulphate or aluminum salt solution takes place not only in the air cavities and capillary pores of the present system, but embraces the whole matrix, so that adhesion and/or cohesion is lost. For this reason, it is an absolute departure from the prior art, and from expert experience, to exploit this phenomenon deliberately at a specific time so as to reduce the adhesion of a fixing agent to the subsurface, and to do this so as to facilitate its easy removal.

For this reason, one important aspect of the present invention is that a special fixing agent in bonded form spontaneously forms ettringite on the addition of sulphate and/or aluminum ions. The aqueous sulphate solution is preferably a water-soluble alkali and/or earth alkali sulphate, and the aqueous aluminum salt solution is preferably a water-soluble alkali and/or earth alkali aluminate. Different additives can be mixed with this solution in order to facilitate the removal process. These can be wetting agents.

According to one preferred embodiment of the present invention, the aqueous sulphate solution is used in a concentration of approximately 0.1 to 30%-wt, in particular from approximately 1 to 20%-wt, and the aqueous solution of the aluminum salt is used in a concentration of approximately 0.1 to 70%-wt, in particular from approximately 1 to 50%-wt.

It is preferred that the layer that is of bonded fixing agent be treated by spraying the whole surface with the aqueous sulphate and/or aluminum salt solution. This is the recommended procedure if only the layer of fixing agent is to be removed from a subsurface such as a plaster, cement paint, filler, floor-levelling and/or porous coating material. The following can be the subsurface: a wall, a floor, or a ceiling that is of concrete, brick, wood, plaster and/or cement board; a layer of old tiles, panels, or the like can also serve as a subsurface.

According to another preferred embodiment of the present invention a textile material is incorporated into the layer of bonded fixing agent; this is brought into contact with the aqueous sulphate solution or the aqueous solution of an aluminum salt in order to moisten the interior of the layer of bonded fixing agent. This textile material can be a fabric or a non-woven fabric that can absorb moisture rapidly, move it, and distribute it evenly across the whole surface. It is preferred that this fabric be extremely absorbent, have a pronounced capillary action, and be capable of moving the aqueous medium in question very effectively. Examples of such materials are cellulose, cellulose acetate, cotton, hemp, jute, sisal, flax, plastics, optionally surface coated, for example polyolefins such as polypropylene, polyester, nylon, aramide, polyvinylalcohol, polyacrylamide, mixed fabrics such as polypropylene/polyacrylic acid, and/or so-called microfibres. The textiles can be calendered on one or both sides in order to standardize their surface characteristics or adjust them as may be desired.

The textile material is intended not only to distribute the aqueous solution efficiently, but also to make it possible to pull the bonded material away from the subsurface, the textile material being removed completely when this is done. With this sort of removal, once it has been washed, the subsurface is ready for a fresh application of hydraulic fixing agent.

Therefore, in addition to sufficient absorbency, capillary action, and the ability to move liquid, it is important that as well as being hydrophilic, the material be strong and tear-resistant. It is preferred that the textile material have a water absorbency (as measured according to DIN 53923 dated January 1978) of approximately 1 to 5000%-wt, in particular of approximately 10 to 4000%-wt and/or a tear resistance (as measured according to DIN 53857) of approximately 5 to 1000 N/5 cm, in particular from approximately 10 to 800 N/5 cm. The tear resistance can, for example, be enhanced by a spun fleece or a reinforcing textile that can optionally be bonded to the textile.

It is also an advantage if the material is easily accessible, which is to say that it protrudes above and below and is covered only by a strip of trim, for example. For purposes of removal, some of the material can also be exposed and then brought into contact with water, which is absorbed by capillary action. The solution that is to be applied can then be allowed to run into the fixing agent from above; given that the material is sufficiently absorbent, the solution can also be absorbed from below, or an access to the material can be created in the surface that is to be removed.

It has also been found to be advantageous if the textile material be of a relatively thick consistency and incorporate no large holes, so that there are no weak spots in the layer. Interspersing the textile material with fixing agent offers no additional advantages; rather, in the case of an appropriately thick textile, this results in improved anchoring of the fixing agent and thus a more stable structure.

According to another particularly preferred embodiment of the present invention, a covering layer is installed on the layer of bonded fixing agent, especially a covering layer in the form of ceramic bonded fabric, plastic panels, in the form of a laminate, of linoleum, or glass, metal, or wood panels such as parquet, for example, flexible rubber floor coverings, textile materials such as carpet and/or colour coatings. This covering layer can be laid directly in the mortar bed or after hardening can be applied with a layer of adhesive. Even if there is a cover layer of this sort, as is the case when there is parging, as discussed above, the sulphate and/or aluminum solution can be applied above or below the cover layer. Another possibility is to bore holes in the cover layer, in joints, or at the intersection of joints, or to remove part or parts of the cover layer in order to gain access to the layer of fixing agent and to such textile material as may be present. The liquid can be introduced by attaching an appropriate device, such as a trough or tub to existing access points or access points that have been made, or through previously made channels in the layer of fixing agent, when any existing textile material will facilitate the continuous absorption, movement, and distribution of the liquid.

Jointing compound of any sort can be used and can contain the hydraulic fixing agent; it can also be in the form of a mixture with a commercial jointing compound, or can be made up exclusively from a jointing compound of the usual kind.

Once the aqueous sulphate solution or the aqueous aluminum salt solution has acted on the layer of bonded fixing agent for at least approximately five hours, in particular for approximately 12 to 48 hours, the cohesion of the layer of bonded fixing agent will have been diminished, so that the layer of bonded fixing agent—optionally with the cover layer—can be removed or pulled off the subsurface. As a rule, because of the action of the sulphate and/or aluminum salt solution, not only is the adhesion of the bonded fixing agent to the subsurface, to the cover layer (if there is one), and to the textile material (if such material is used), considerably reduced, but its cohesive force is also greatly diminished, which is to say that the fixing agent is made soft and friable, and it loses its original consistency. This make it much easier to remove. This easier removal is possible at any time after application of the layer of fixing agent and can, for example, by effected at a desirable time after one or several years, regardless of whether there is a cover layer on the layer of fixing agent.

Despite the possibility of completely modifying the consistency of the bonded fixing agent by the addition of a sulphate and/or aluminum salt solution, the addition of water has no such effect, and leaves the consistency, and the adhesive effect unchanged. Tests have shown that after being kept in sodium sulphate, as compared to being kept in water, the adhesive values are clearly reduced. This results in the simplified removability, either, for example, by means of the embedded textile material or by mechanical means such as a screwdriver.

There are many advantages inherent in the present invention. The hydraulic fixing agent according to the present invention and the method according to said invention permits the installation and removal of tiles, panels, and the like to walls, ceilings, or floors. No labour intensive, time consuming or costly procedures are required in order to remove the coatings or coverings. The subsurface can be removed without any problems even after some years, at which time only toxicologically benign chemical substances in the form of sulphate or aluminum salt solutions are used.

In addition, the method according to the present invention is surprisingly flexible, since any material such a concrete, bricks or existing tiling can be used as the subsurface to which a layer of fixing agent has been applied. In the same way, there are for all practical purposes no restrictions with respect to the covering layer. All the customary materials that can be laid with a hydraulic fixing agent, e.g., ceramic, glass, plastic, wood, metal or the like, can be used.

It is only with respect to the proportions of Portland cement, aluminum and sulphate components that care must be taken, so that the properties of the adhesive pull strength are maintained when acted upon by water, sulphate and/or aluminum salt solution, in order that easy removal of the bonded fixing agent is made possible.

Furthermore, according to the present invention, the dust and dirt that are usually generated when removing tiles or panels are avoided. Because of the fact that the material is removed or detached without any damage being done to the subsurface, it needs no subsequent work, with the result that loss of use is kept to a minimum. This results in greatly reduced renovation cycles and all the advantages associated with this. It is surprising that, despite the simple removability, there is still sufficient adhesion of the layer of bonded fixing agent to the subsurface and to the tiles on the layer of bonded fixing agent, so that there are no problems related to exposure to water, i.e., the tiles remain securely in place if acted upon by water.

The present invention will be described in greater detail below on the basis of the drawings appended hereto.

Figure 1:
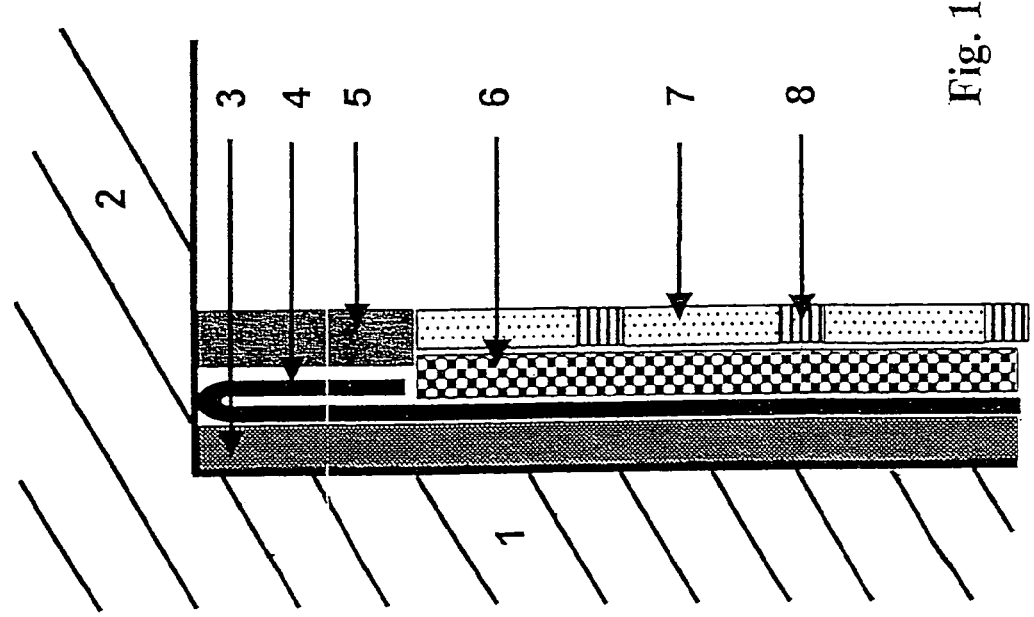
FIG. 1: the system in which the hydraulic fixing agent according to the present invention is incorporated.

FIG. 1 shows the application system as applied. The following structures are located on the wall (1) as far up as the ceiling (2): The upper part of the textile (4) beneath the ceiling (2) is covered by a cover or trim strip (5). On the layer (3), which can contain the hydraulic bonding agent according to the present invention, there is a separating textile (4), the upper part of which is turned back behind the cover or trim strip (5). On the separating textile (4) there is a layer (6) of tile adhesive that contains the hydraulic fixing agent according to the present invention; this layer (6) does not extend as far up as the ceiling (2). This is followed by a layer (7) of tiles with joints (8) that are filled with tile cement.

FIG. 2 shows the same system as FIG. 1; here, the solution (10) according to the present invention that that is used to release the tiles, is poured into a pan (9), once the cover or trim strip (5) has been removed. Because of this absorption by the separating textile (4), the solution is distributed across the whole of the surface behind the layer of non-woven textile (7). The layer (6) of the tile adhesive, with which the separating textile (4) is in contact, absorbs all of the solution, so that the formation of ettringite and thus expansion is initiated in the layers (3), (6), and optionally (8). The bond of the layers that are shown can be loosened without any problems after approximately 15 hours by simply pulling on the overhanging part of the separating textile (4).

In principle, both the present invention and the method according to the present invention are fundamentally suitable for use with floor coverings. In this connection, it is advantageous that the particular subsurface is so treated when tiles are laid that the effect of the solution that is used according to the present invention does not damage the subsurface. This can be ensured, for example, by impregnation or application of a sealing compound.

The following describes a number of examples in which the hydraulic bonding agent according to the present invention is used:

EXAMPLE 1

56.7 parts aluminous cement (Ternal W), 20.7 parts Hartformengips No. 1, 12.6 parts white cement, 0.5 g tartaric acid, and 25.0 g dispersion powder based on ethylene-vinyl acetate were mixed with 57.5 g water and stirred for 45 seconds in a 40-mm propellor stirrer at a speed of 900 rpm. Next, a thin mortar layer was applied to the whole surface of a cement-fibre panel (width, 30 cm, height 60 cm) and a commercially available jute-fibre fabric was laid on this and pressed down lightly by hand. Next, jointing was effected with a commercial pointing cement, the uppermost joint being left exposed.

After it had been kept for 14 days in a normal climate, a small trough was secured to the vertical tiled cement fibre panel at the unpointed joints, and the edge sealed with silicone. Next, a 20%-wt aqueous solution of sodium sulphate solution was poured into the trough. This was distributed by the jute fabric, so that—particularly at the start—it was ensured that there was always sufficient solution in the trough. In the event that any solution escaped through small leaks, these were sealed with silicone. After the solution had been added for the first time, after 24 hours it was seen that a few tiles had been released from the subsurface. When an attempt was made to remove the tube that had been secured to the tiles with silicone, the whole layer of tiles was released from the subsurface.

EXAMPLE 2

Example 1 was repeated, but the tiled cement fibre panel was kept for 21 days in a normal climate. Normal tap water was poured into the trough in place of the aqueous sodium sulphate solution. After 24 hours, there were no indications that the tiles were no longer adhering to the subsurface, or that cracks were forming. For this reason, the system was kept for an additional six days in a normal climate. Then, as in Example 1, a 20% aqueous sodium sulphate solution was poured into the trough. After 24 hours, the tiles could be removed as in Example 1.

Example 2 shows that watering has no negative effects on the subsequent removal of the tiles according to the present invention.

EXAMPLE 3

Five parts CEM 1 32.5 Portland cement, 32 parts aluminous cement (Fondue Lafarge), 12 parts Hartformengips No. 1, 25 parts quartz sand (grain size 0.08 to 0.2 mm), 18 parts calcium carbonate (mean particle size 45 $\mu$m) 0.3 parts cellulose ether (viscosity as 2-% aqueous solution: 15,000 mPas), 0.1 parts sodium gluconate, 2 parts of a commercially available stratum silicate, and 6 parts of dispersion powder based on ethylene-vinyl acetate were mixed with 25 parts water and stirred for 45 seconds in a 40-mm propellor mixer at a speed of 900 rpm. The mortar was applied to two concrete panels, in each instance after a 0-coat, using a 6×6×6 mm notched trowel at a 60° angle, and 5×5 cm vitrified clay tiles were laid by hand in the mortar bed. After three days in a normal climate, one panel was placed in tap water, and the other was placed in a 15-% aqueous sodium sulphate solution adjusted to pH 12.5 with sodium hydroxide. The adhesive pull strength was measured after various storage times; the results are set out in Table 1.

EXAMPLE 4

Example 3 was repeated. 25.7 parts CEM 1 32.5 Portland cement, 13.7 parts aluminous cement (Fondue Lafarge), 9.6 parts Hartformengips No 1, 25 parts quartz sand (grain size 0.08 to 0.2 mm), 18 parts calcium carbonate (mean particle size 45 $\mu$m) 0.3 parts cellulose ether (viscosity as 2-% aqueous solution: 15,000 mPas), 0.1 parts sodium gluconate, 2 parts of a commercially available stratum silicate, and 6 parts of dispersion powder based on ethylene vinylacetate were mixed with 26 parts water.

EXAMPLE 5

Example 3 was repeated. 52.5 parts CEM 1 32.5 Portland cement, 25.7 parts quartz sand (grain size 0.1 to 0.3 mm), 22.5 parts calcium carbonate (mean particle size 45 μm) 0.5 parts cellulose ether (viscosity as 2-% aqueous solution: 15,000 mPas), 0.5 parts cellulose fibre, and 1.5 parts dispersion powder based on ethylene-vinyl acetate were mixed with 25 parts water.

EXAMPLE 6

Example 3 was repeated. 20 parts CEM 1 32.5 Portland cement, 15 parts aluminous cement (Fondue Lafarge), 15 parts Hartformengips No. 1, 15 parts quartz sand (grain size 0.08 to 0.2 mm), 18.6 parts calcium carbonate (mean particle size 45 μm), 10 parts of a commercially available light filler, 0.3 parts cellulose ether (viscosity as 2-% aqueous solution: 15,000 mPas), 0.2 parts tartaric acid, 2 parts of a commercially available stratum silicate, and 4 parts of dispersion powder based on ethylene vinylacetate were mixed with 37 parts water. Storage took place under extreme conditions in order to bring about artificial aging: after 5 hours in a normal climate, the samples were stored for 3 days in a normal climate, followed by 3 days at 45° C. and 90% relative humidity, followed by 2 days in a normal climate.

EXAMPLE 7

Example 6 was repeated. 22.5 parts CEM 1 32.5 Portland cement, 15 parts aluminous cement (Fondue Lafarge), 12.5 parts Hartformengips No. 1 were used, and the whole of the mortar mixture was mixed with 40 parts water.

EXAMPLE 8

Example 6 was repeated. 27.5 parts CEM 1 32.5 Portland cement, 15 parts aluminous cement (Fondue Lafarge), 7.5 parts Hartformengips No. 1 were used, and the whole of the mortar mixture was mixed with 36 parts water.

TABLE 1

Adhesive pull strength after storage for different periods in sodium sulphate solution (pH 12.5). The values are given in $N/mm^2$.
The values in parentheses indicate standard variations (in $N/mm^2$)

| | | Time stored in Solution | | | | |
|---|---|---|---|---|---|---|
| | Dry | 8 hours | 15 hours | 24 hours | 40 hours | 72 hours |
| Example 3 | 1.25 (0.12) | 0.49 (0.12) | 0.08 (0.05) | 0.05 (0.04) | 0.05 (0.00) | 0.04 (0.01) |
| Example 4 | 1.04 (0.11) | 0.21 (0.16) | 0.01 (0.00) | 0.04 (0.03) | 0.05 (0.04) | 0.07 (0.04) |
| Example 5 (comparison) | 0.98 (0.03) | 0.44 (0.06) | 0.62 (0.02) | 0.45 (0.010) | 0.49 (0.01) | 0.51 (0.03) |
| Example 6 | 0.63 (0.02) | 1) | 0.22 (0.02) | 1) | 2) | 1) |
| Example 7 | 0.78 (0.16) | 1) | 0.18 (0.03) | 1) | 2) | 1) |
| Example 8 | 0.63 (0.00) | 1) | 0.07 (0.01) | 1) | 0.08 (0.00) | 1) |

TABLE 2

Adhesive pull strength after different times in storage in tap water. The values are given in $N/mm^2$. The values in parentheses indicate standard variations (in $N/mm^2$)

| | | Time stored in Solution | | | | |
|---|---|---|---|---|---|---|
| | Dry | 8 hours | 15 hours | 24 hours | 40 hours | 72 hours |
| Example 3 | 1.25 (0.12) | 0.89 (0.15) | 0.99 (0.02) | 0.83 (0.02) | 0.69 (0.12) | 0.63 (0.03) |
| Example 4 | 1.04 (0.11) | 0.88 (0.10) | 0.84 (0.09) | 0.67 (013) | 0.54 (0.11) | 0.44 (0.05) |
| Example 5 (comparison) | 0.83 (0.03) | 0.26 90.05) | 0.23 (0.03) | 0.14 (0.00) | 0.30 (0.03) | 0.43 (0.02) |
| Example 6 | 0.06 (0.02) | 1) | 0.19 (0.00) | 1) | 0.18 (0.02) | 1) |
| Example 7 | 0.78 (0.16) | 1) | 0.25 (0.04) | 1) | 0.29 (0.04) | 1) |
| Example 8 | 0.63 (0.00) | 1) | 0.18 (0.00) | 1) | 0.22 (0.01) | 1) |

Legend for Tables 1 & 2
1) No measured value
2) Removal by hand

EXAMPLE 9

A gypsum panel that was installed so as to be vertical was covered with a commercial primer. A mortar mixture as described in Example 6 was then applied to an area 65 cm wide and 120 cm high, using a notched trowel, and then smoothed. A 65-cm wide polypropylene bonded fabric (120 g/cm², calendered on one side) was then laid in place and pressed down, when it was ensured that at the top, the fabric extended for 15 cm beyond the layer of mortar. Next, four rows of seven stoneware tiles each (15×15 cm) were laid in the mortar, so that a total area of 62×108 cm was tiled. After one day, the joints were grouted with a commercial jointing adhesive.

After one week, a plastic trough was secured to the upper tiled edge, and a total of 1.4 liters of a 15-% sodium sulphate solution (adjusted to pH 12.5 with NaOH). The projecting part of the fabric was immersed in the solution, so that the solution was absorbed and distributed throughout the mortar bed. After one day, it was possible to remove the uppermost tiles very easily with a screwdriver. Then, the exposed fabric could be pulled by hand, so that the remainder of the tiles could be removed without any problem.

The coating so exposed could then be washed with water, and the procedure (Example 9) repeated.

What is claimed is:

1. A method for reducing the cohesion of a layer of bonded fixing agent, obtained with an hydraulic fixing agent that is based on Portland cement, a sulphate and aluminum component, and optionally other additives, wherein the hydraulic fixing agent, has (1) an adhesive pull strength of at least approximately 0.15 N/mm² when acted upon by water for 40 hours and (2) an adhesive pull strength of at most approximately 0.10 N/mm² when acted upon by an aqueous sulphate solution and/or an aqueous solution of an aluminum salt, each with a pH value of 12.5, for 40 hours, characterized in that the layer of bonded fixing agent is treated with an aqueous sulphate solution and/or an aqueous solution of an aluminum salt, each of which has a pH of at least approximately 7.5 and the layer of bonded fixing agent with its cohesion reduced is removed.

2. The method as defined in claim 1, characterized in that a water-soluble alkali, earth alkali sulphate or mixture of alkali and earth alkali sulphate is used as the aqueous sulphate solution and/or a water-soluble alkali or earth alkali aluminate is used as the aqueous solution of an aluminum salt.

3. The method as defined in claim 1, characterized in that the aqueous sulphate solution is used in a concentration of approximately 0.1 to 30%-wt, and the aqueous solution of the aluminum salt is used in a concentration of approximately 0.1 to 70%-wt.

4. The method as defined in claim 3, characterized in that the aqueous sulphate solution is used in a concentration of from approximately 1 to 20%-wt.

5. The method as defined in claim 3, characterized in that the aqueous solution of the aluminum salt is used in a concentration of from approximately 1 to 50%-wt.

6. The method as defined in claim 1, characterized in that the layer of bonded fixing agent is sprayed with the aqueous sulphate solution and/or the aqueous solution of an aluminum salt.

7. The method as defined in claim 1, characterized in that incorporated in the layer of bonded fixing agent there is a textile material that is brought into contact with the aqueous sulphate solution or the aqueous solution of an aluminum salt, in order to moisten the interior of the layer of bonded fixing agent.

8. The method as defined in claim 7, characterized in that a fabric or a non-woven textile is used as textile material.

9. The method as defined in claim 7, characterized in that the textile material has a water absorbency (as measured according to DIN 53923, dated January 1978) of approximately 1 to 5000%-wt, and/or a tear resistance (as measured according to DIN 53857) of approximately 5 to 1000 N/5 cm.

10. The method as defined in claim 7, characterized in that the textile material is hydrophilic.

11. The method as defined in claim 10, characterized in that the textile material is selected from the group consisting of cellulose, cellulose acetate, cotton, hemp, jute, sisal, flax, plastics, surface coated microfibres, uncoated microfibres and mixtures thereof.

12. The method as defined in claim 1, characterized in that a covering layer is formed on the layer of bonded fixing agent.

13. The method as defined in claim 12, characterized in that the covering layer is formed in the form of ceramic tiles; plastic, glass, metal or wood panels; colour coatings; textile materials, or mixtures thereof.

14. The method as defined in claim 12, characterized in that once the cohesion has been reduced, the layer of bonded fixing agent is removed from a subsurface that is optionally bonded to the covering layer.

15. The method as defined in claim 1, characterized in that the aqueous sulphate solution or the aqueous solution of the aluminum salt acts on the layer of bonded fixing agent for at least approximately five hours.

16. The method as defined in claim 15, characterized in that the aqueous sulphate solution or the aqueous solution of the aluminum salt acts on the layer of bonded fixing agent for approximately 12 to 48 hours.

17. The method as defined in claim 1, wherein the pH is in the range of approximately 9 to 14.

* * * * *